(12) United States Patent
Chen (10) Patent No.: US 10,051,180 B1
(45) Date of Patent: Aug. 14, 2018

(54) METHOD AND SYSTEM FOR REMOVING AN OBSTRUCTING OBJECT IN A PANORAMIC IMAGE

(71) Applicant: Scott Zhihao Chen, Irvine, CA (US)

(72) Inventor: Scott Zhihao Chen, Irvine, CA (US)

( * ) Notice: Subject to any disclaimer, the term of this patent is extended or adjusted under 35 U.S.C. 154(b) by 211 days.

(21) Appl. No.: 15/061,930

(22) Filed: Mar. 4, 2016

(51) Int. Cl.
| | |
|---|---|
| H04N 5/232 | (2006.01) |
| G06T 7/194 | (2017.01) |
| G06T 3/40 | (2006.01) |
| H04N 5/272 | (2006.01) |
| G06T 7/30 | (2017.01) |
| G06T 11/60 | (2006.01) |

(52) U.S. Cl.
CPC ....... H04N 5/23238 (2013.01); G06T 3/4038 (2013.01); G06T 7/194 (2017.01); G06T 7/30 (2017.01); G06T 11/60 (2013.01); H04N 5/272 (2013.01); *G06T 2207/20221* (2013.01)

(58) Field of Classification Search
CPC .. H04N 5/23238; H04N 5/272; G06T 3/4038; G06T 2207/20221; G06T 7/194; G06T 7/30
See application file for complete search history.

(56) References Cited

U.S. PATENT DOCUMENTS

| | | | | |
|---|---|---|---|---|
| 7,418,131 | B2 * | 8/2008 | Wang | G06T 11/001 |
| | | | | 345/619 |
| 7,555,158 | B2 * | 6/2009 | Park | G06T 11/60 |
| | | | | 345/619 |
| 8,615,111 | B2 * | 12/2013 | Garten | G06T 5/005 |
| | | | | 382/107 |
| 8,964,025 | B2 * | 2/2015 | Cudak | H04N 13/0007 |
| | | | | 348/135 |
| 9,191,642 | B2 * | 11/2015 | Cudak | H04N 13/0007 |
| 9,247,129 | B1 * | 1/2016 | Gray | G06T 7/11 |
| 9,286,707 | B1 * | 3/2016 | Switkin | G06K 9/4652 |
| 9,560,271 | B2 * | 1/2017 | Na | H04N 5/23222 |
| 9,641,818 | B1 * | 5/2017 | Sharma | H04N 9/74 |
| 9,697,595 | B2 * | 7/2017 | Bedi | G06T 5/50 |
| 9,699,380 | B2 * | 7/2017 | Somanath | H04N 5/23238 |
| 9,767,539 | B2 * | 9/2017 | Zamfir | G06T 5/003 |
| 9,807,306 | B2 * | 10/2017 | Yu | H04N 5/23293 |
| 2005/0129324 | A1 * | 6/2005 | Lemke | H04N 1/387 |
| | | | | 382/254 |

(Continued)

FOREIGN PATENT DOCUMENTS

JP 2014011782 A * 1/2014

*Primary Examiner* — John Villecco (57) ABSTRACT

A system and machine-implemented method of generating panoramic digital representation of an area are provided. A first image and a second image are acquired by a first camera and a second camera of an imaging system, respectively. A coordinate transformation of the first image and the second image to image is performed to generate a first projected image and a second projected image. The first projected image and the second projected image are compared to generate a first aligned image and a second aligned image. An area of difference between the first aligned image and the second aligned image is identified. Whether the identified area of difference includes image data of an obstructing object in a close range within the imaging system is determined. Image data of the obstructing object from the first aligned image is removed, thereby generating a panoramic digital representation of the area.

16 Claims, 7 Drawing Sheets

(56) References Cited

U.S. PATENT DOCUMENTS

| | | | | |
|---|---|---|---|---|
| 2005/0168594 | A1* | 8/2005 | Larson | G06T 3/4038 348/222.1 |
| 2011/0149016 | A1* | 6/2011 | Kimura | H04N 5/232 348/36 |
| 2011/0242286 | A1* | 10/2011 | Pace | H04N 13/0025 348/47 |
| 2012/0262569 | A1* | 10/2012 | Cudak | H04N 13/0007 348/135 |
| 2012/0262572 | A1* | 10/2012 | Cudak | H04N 13/0007 348/135 |
| 2013/0106990 | A1* | 5/2013 | Williams | G06T 3/4038 348/36 |
| 2014/0321771 | A1* | 10/2014 | Reinisch | G06T 11/60 382/284 |
| 2015/0131924 | A1* | 5/2015 | He | G06T 3/0018 382/284 |
| 2016/0050368 | A1* | 2/2016 | Seo | G06T 7/11 348/36 |
| 2017/0294006 | A1* | 10/2017 | Cabral | G06T 5/50 |
| 2017/0359523 | A1* | 12/2017 | Rubinstein | G06T 7/30 |
| 2018/0013953 | A1* | 1/2018 | Evans, V | G06T 3/0062 |

* cited by examiner

METHOD AND SYSTEM FOR REMOVING AN OBSTRUCTING OBJECT IN A PANORAMIC IMAGE

BACKGROUND

The present disclosure relates to the field of panoramic imaging, and more particularly to providing for removing an obstructing object in a panoramic image. The obstructing object is located within a close range of a panoramic imaging system that captures the panoramic image.

Panoramic photography, the taking of a photograph or photographs covering an elongated field of view, has a long history in photography. Perhaps the most primitive method of panoramic photography is the taking of several adjoining photos with a conventional camera and then mounting the prints together in alignment to achieve a complete panorama. Modern techniques adapt this method by using digital cameras to capture the images, and then using computer image processing techniques to align the images for printing as a single panorama.

The continuous development of digital camera technologies along with constantly increasing speed and processing power of computers have laid the foundation for digital imaging systems that are capable of acquiring image data for the automatic creation of wide to entire 360° panoramas, including both still panoramic images and dynamic panoramic movies.

In many panoramic images, one or more undesirable obstructing objects within a close-range of a panoramic imaging system are captured. In some aspects, the obstructing objects may include still objects, such as an equipment that mounts and/or supports panoramic imaging systems including, for example, a tripod. In some aspects, the obstructing objects may include moving objects, such as vehicles accidentally entering into the field of view of the panoramic imaging systems. The obstructing objects may obstruct the target scenes and degrade authenticity and aesthetics of the panoramic images.

SUMMARY

The disclosed subject matter relates to a machine-implemented method. The method comprises acquiring a first image and a second image by a first camera and a second camera of an imaging system, respectively. The method further comprises performing a coordinate transformation of the first image and the second image to image to generate a first projected image and a second projected image. The method further comprises comparing the first projected image and the second projected image to generate a first aligned image and a second aligned image. The method further comprises identifying an area of difference between the first aligned image and the second aligned image. The method further comprises determining whether the identified area of difference includes image data of an obstructing object in a close range within the imaging system. In addition, the method comprises removing image data of the obstructing object from the first aligned image, in response to the determination that the identified area of difference in the first aligned image includes image data of an obstructing object in a close range within the imaging system, thereby generating a panoramic digital representation of the area.

The disclosed subject matter also relates to a system for generating panoramic digital representation of an area. The system comprises a plurality of cameras having a field of view that overlaps with the field of view of at least one other camera among the plurality of cameras. The system comprises a controller commanding a first camera and a second camera among the plurality of cameras to acquire a first image and a second image, respectively. The system comprises a processor comprising instructions stored therein, which when executed by the processor, cause the processor to perform operations comprising performing a coordinate transformation of the first image and the second image to image to generate a first projected image and a second projected image. The operations further comprise comparing the first projected image and the second projected image to generate a first aligned image and a second aligned image. The operations further comprise identifying an area of difference between the first aligned image and the second aligned image. The operations further comprise determining whether the identified area of difference includes image data of an obstructing object in a close range within the system. In addition, the operations comprise removing image data of the obstructing object from the first aligned image or the second aligned image, in response to the determination that the identified area of difference in the first aligned image includes image data of an obstructing object in a close range within the system, thereby generating a panoramic digital representation of the area.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, structures and components are shown in block diagram form in order to avoid obscuring the concepts of the subject technology.

Provided herein are systems and methods for acquiring, creating and presenting panoramas, including still images and movies. According to one aspect of the present disclosure, a panoramic imaging system is provided. The panoramic imaging system according to the present disclosure includes at least an optical system, an image processing algorithm and a control system. Particularly, the optical system includes a set of cameras and is capable of capturing image information from a wide to ultra-wide field of view with high resolution, quality and visual reality. The image processing algorithm is capable of instantly processing image inputs by the set of cameras into continuous and seamless panoramas for real-time presentation. Finally, the control system takes commands from an end user and controls the system to perform various functions. The present system and methods integrate image acquisition, image processing, instant and real-time panoramic presentation, mobile application, wireless data communication, cloud computing, remote storage and other external services.

Figure 1:
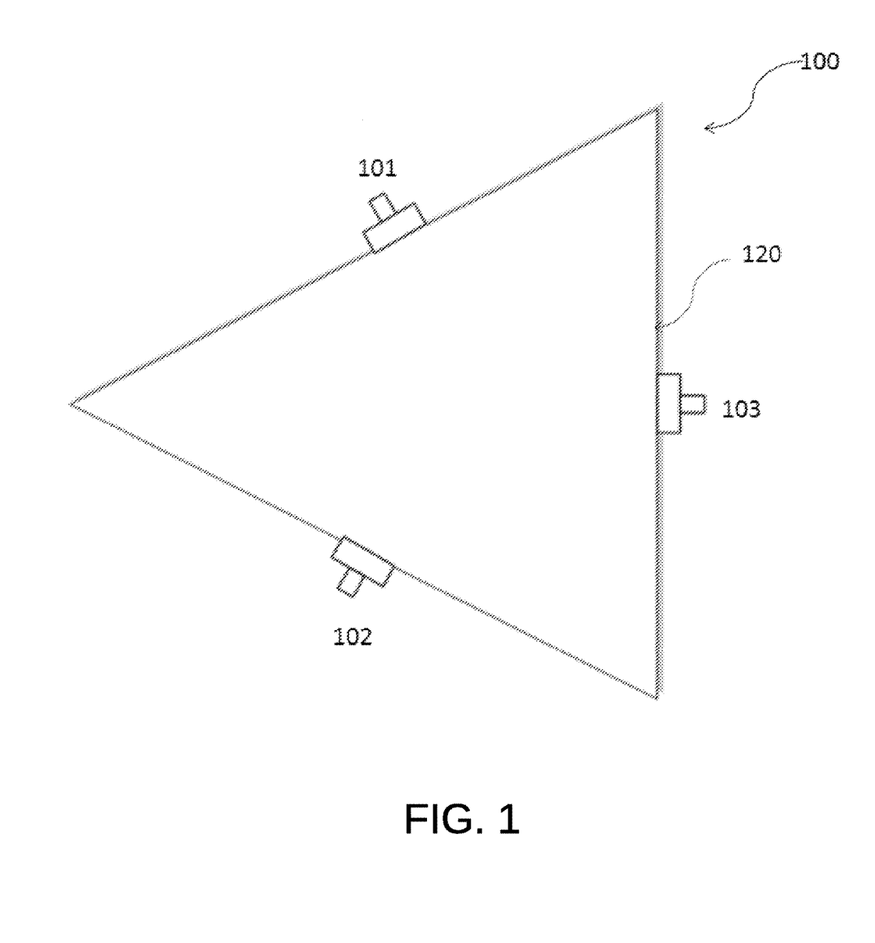
FIG. 1 is a schematic top view of an example panoramic imaging system according to certain aspects of the disclosure.

FIG. 1 is a schematic top view of an example panoramic imaging system according to certain aspects of the disclosure. Not all of the depicted components may be used, however, and one or more implementations may include additional components not shown in the figure. Variations in the arrangement and type of the components may be made without departing from the scope of the subject technology. Additional components, different components, or fewer components may be provided.

As shown in FIG. 1, panoramic imaging system 100 of FIG. 1 includes cameras 101, 102, 103, a control system (not shown) and housing 120. Each of cameras 101, 102 and 103 may be a digital camera. In some aspects, each of cameras 101, 102 and 103 may include a wide-angle lens (e.g., fisheye lens) to capture image data. The horizontal angle of view of a wide-angle lens may be greater than 180 degrees and the vertical angle of view of a wide-angle lens may be greater than 180 degrees. FIG. 1 shows cameras 101, 102 and 103 are distributed evenly across on a frame of housing 120, for example, on three vertices of the frame with a triangle shape. Each of cameras 101, 102 and 103 may face a ⅓ of a 360° field. It can be appreciated that cameras 101, 102 and 103 may be distributed in any other arrangement and each of cameras 101, 102 and 103 may face any portion of a 360° field.

The control system may include one or more electronic circuitries, such as a system on chip (SOC) with A field-programmable gate array (FPGA), Accelerated Processing Unit (APU) and peripheral electronic circuitries, for processing the image data captured by cameras 101, 102, and 103 to produce wide to entire 360° panoramas, including both still images and movies. It can now be appreciated that outputs of panoramic imaging system 100 may be panoramas stitched from a set of original images captured by cameras 101, 102, and 103.

Cameras 101, 102, 103 and the control system may be enclosed in housing 120, such as a protective housing to reduce environmental effects on the components. In some embodiments, the protective housing is waterproof, dust-proof, shockproof, freeze-proof, or any combination thereof. In some aspects, housing 120 may include one or more mechanical parts for mounting, housing and/or moving the cameras 101, 102 and 103 and/or other optical components. Further, in some embodiments, cameras 101, 102, 103 can be reversibly coupled to or detached from the remaining system, such that an end user may select different models of cameras 101, 102, 103 to be used with panoramic imaging system 100 according to particular needs or preferences.

It can be now appreciated that a variety of embodiments of cameras 101, 102, 103 may be employed. These embodiments may have different numbers and/or arrangements of cameras 101, 102, 103, but a common feature may be that each camera's field of view overlaps with that of at least one other camera, thereby enabling panoramic imaging system 100 to capture a total field of view according to the design. Those of ordinary skills in the art upon reading the present disclosure should become aware of how a panoramic imaging system according to the present disclosure can be designed to satisfy particular needs. Particularly, skilled persons in the art would follow the guidance provided by the present disclosure to select a suitable number of cameras with reasonable fields of view and arrange the set of cameras such that neighboring cameras' fields of view have reasonable overlap that enables the system to cover a desirable total field and reliably process image information in the overlapping field to produce panoramas.

Figure 2:
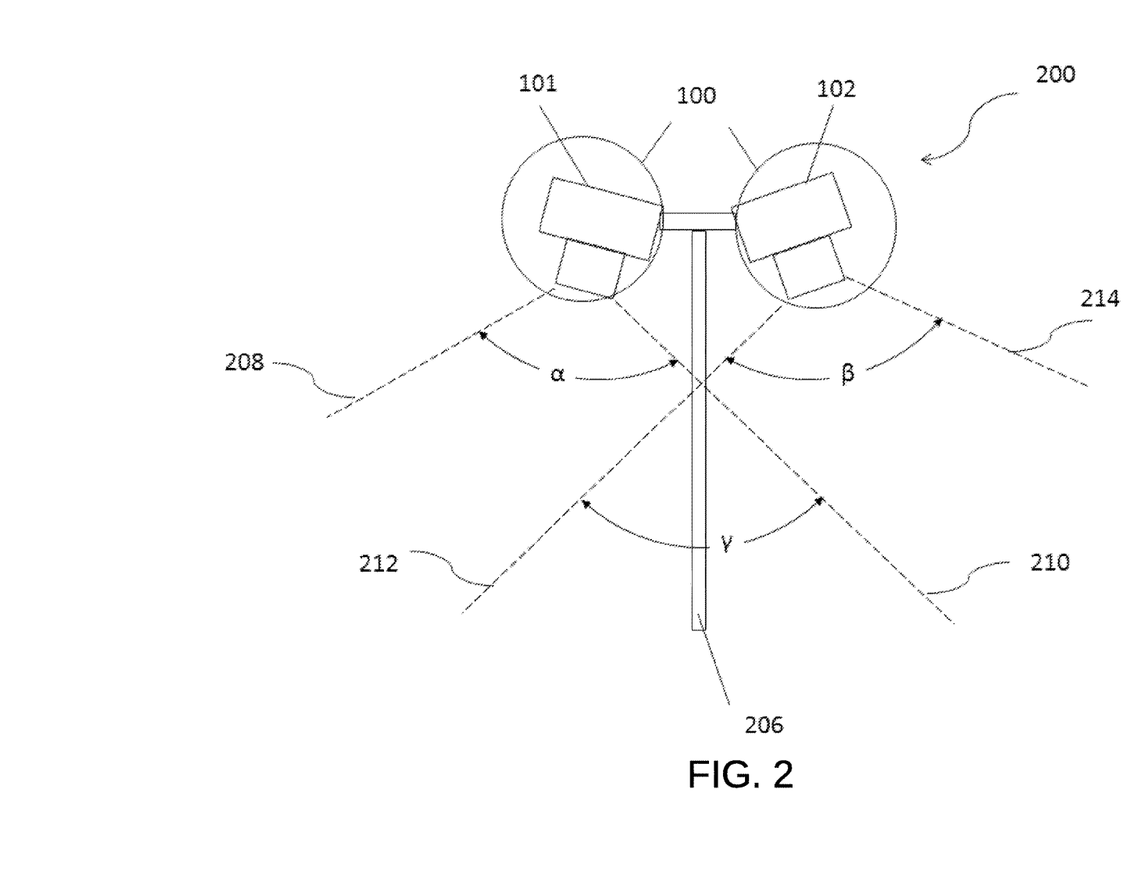
FIG. 2 is a perspective view of an example panoramic imaging system of FIG. 1 with an obstructing object according to certain aspect of the present disclosure.

FIG. 2 is a perspective view of an example panoramic imaging system of FIG. 1 with an obstructing object according to certain aspect of the present disclosure. Not all of the depicted components may be used, however, and one or more implementations may include additional components not shown in the figure. Variations in the arrangement and type of the components may be made without departing from the scope of the subject technology. Additional components, different components, or fewer components may be provided.

As described with reference to FIG. 1, panoramic imaging system 100 of FIG. 1 includes cameras 101, 102 and 103, a control system and housing 120. As shown in FIG. 2, camera 101 has a field of view located between dashed lines 208 and 210, and the angle of the field of view is designated as α. Camera 102 has a field of view located between dashed lines 212 and 214, and the angle of the field of view is designated as β. In some aspects, the fields of view of camera 101 and camera 102 overlap; the overlapping angle is designated as γ. Objects in the overlapping field of view is visible to both camera 101 and camera 102.

As shown in FIG. 2, obstructing object 206 may include a mechanical part that mounts and/or supports panoramic imaging system 100 systems including, for example, a tripod. In some aspects, obstructing object 206 may include a moving object, such as a vehicle accidentally entering into the field of view of panoramic imaging system 100. In some aspects, obstructing object 206 may locate in an overlapping field of view of camera 101 and camera 102, and may be captured by both camera 101 and camera 102. In some aspects, obstructing object 206 may be any close-range object that obstructs a target scene captured by camera 101 and camera 102.

Figure 3:
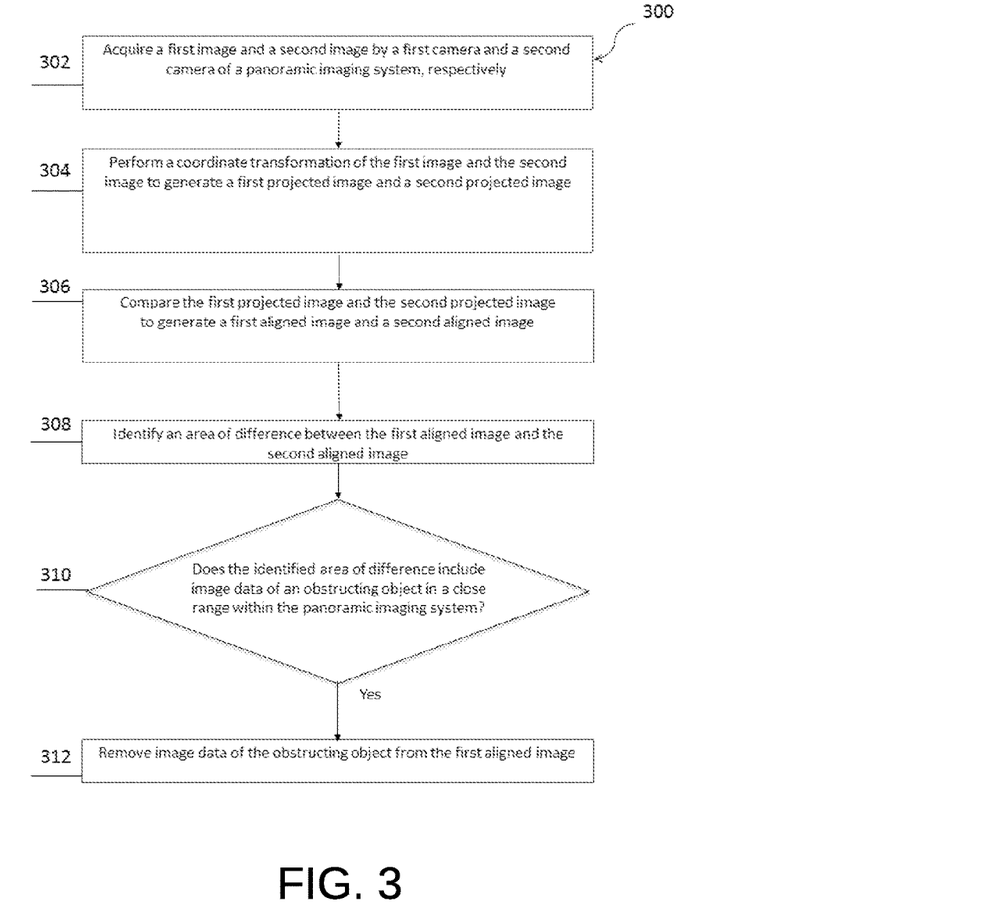
FIG. 3 illustrates a flow diagram of an example process for removing an obstructing object in a panoramic image according to one embodiment of the present disclosure.

FIG. 3 illustrates a flow diagram of an example process for removing an obstructing object in a panoramic image according to one embodiment of the present disclosure. The obstructing object is located within a close range of a panoramic imaging system that captures the panoramic image. For explanatory purposes, the example process 300 is primarily described herein with reference to panoramic imaging system 100 in FIG. 2; however, the example process 300 is not limited to panoramic imaging system 100 in FIG. 2, and the example process 300 may be performed by one or more components of panoramic imaging system 100 in FIG. 2. Further for explanatory purposes, the blocks of the example process 300 are described herein as occurring in serial, or linearly. However, multiple blocks of the example process 300 may occur in parallel. In addition, the blocks of the example process 300 may be performed a different order than the order shown and/or one or more of the blocks of the example process 300 may not be performed.

At step 302, panoramic imaging system 100 acquires a first image and a second image by a first camera and a second camera, respectively. The first image and the second image may contain an image of an obstructing object located within a close range of the panoramic imaging system. In some aspects, the first camera and the second camera may refer to any two cameras of the panoramic imaging system that have an overlapping field of view. The first camera and the second camera may capture the obstructing object within a close range of the panoramic imaging system at substantially the same time, or within a predetermined periods of time, such as a minute, a second, or less. In some aspects, the first image and the second image may be captured at substantially the same time, or within a predetermined periods of time, such as a minute, a second, or less.

In some aspects, the first camera may include camera 101 and the second camera may include camera 102 of panoramic imaging system 100 in FIG. 2. In one example, the first image may be captured by camera 101 in panoramic imaging system 100 in FIG. 2; and the second image may be captured by camera 102 in panoramic imaging system 100 in FIG. 2. In another example, the obstructing object may include obstructing object 206 located within a close range of panoramic imaging system 100 in FIG. 2.

At step 304, panoramic imaging system 100 performs a coordinate transformation of the first image and the second image to generate a first projected image and a second projected image. In some aspects, if the orientation of a front element (e.g., lens) of the first camera and the orientation of a front element (e.g., lens) of the second camera is not parallel to each other, each pixel of the first image and each pixel of the second image captured may be projected onto a destination surface to align one or more background components of the first image and one or more background components of the second image. Background components may include distant pixels in the images. In some aspects, the destination surface may include a cylindrical surface. However, the geometry of the destination surface may not be limited to a cylindrical surface. In some aspects, the destination surface may include a flat surface. In other aspects, the destination surface may include any curved surface comprising an equal curvature, such as an equal radius.

In some aspects, projection of each pixel in the first image and the second image onto the destination surface may be performed by a coordinate transformation process. Original coordinates of a pixel in the first image or the second image may correspond to destination coordinates of the pixel as a 1-to-1 correspondence after projection. The coordinate transformation process may utilize different types of the destination coordinate systems. In one example, a cylindrical coordinate system may be used as the destination coordinate system in the coordinate transformation process.

In this step, a coordinate transformation process may establish cylindrical coordinates for each pixel in an original flat image plane. Particularly, each pixel I(x,y) in an original flat image plane is projected onto a cylindrical surface tangential to the original flat image plane. The projected pixel is then designated as I(x', y'). Further, if the radius of the cylindrical surface is denoted as f, the cylindrical coordinate transformation of I(x, y) to I(x', y') can be expressed as $$x' = f \cdot \arctan\left(\frac{x}{f}\right)$$
$$y' = y \cdot \cos\left(\frac{x}{f}\right)$$

After performing the coordinate transformation process, panoramic imaging system may generate a first projected image after a coordinate transformation of the first image and a second projected image after a coordinate transformation of the second image.

At step 306, panoramic imaging system 100 compares the first projected image and the second projected image to generate a first aligned image and a second aligned image. In some aspects, panoramic imaging system 100 compares the first projected image and the second projected image to determine one or more displacements between the first projected image and the second projected image. One or more displacements may include a horizontal translation, vertical translation, a difference in the amount of 2D rotation surrounding the center of an image, and/or a combination thereof. In some aspects, one or more displacements may be determined by a pixel-based alignment. In some aspects, the pixel-based alignment of the first projected image and the second projected image may be performed by comparing the first background and the second background, for example the distant pixels. The pixel-based alignment may shift or wrap the first projected image and the second projected image and estimate translational or rotational alignment by checking how much the pixels agree. Alternatively or in addition, a search mechanism may be used to establish a hierarchical order among discrete pixels to be searched to find the optimal value of the one or more displacements that makes the error metrics' value minimal.

After the pixel-based alignment, a first aligned image and a second aligned image may be generated based on the first projected image and the second projected image and the determined one or more displacements. A first aligned image may be generated by shifting or wrapping each pixel of the first projected image by the determined one or more displacements, and the second aligned image may stay the same as the second projected image. In some aspects, a second aligned image may be produced by shifting or wrapping the pixels of the second projected image by the determined one or more displacements, and the first aligned image may stay the same as the first projected image.

In some aspects, the orientation of a front element (e.g., lens) of the first camera and the orientation of a front element (e.g., lens) of the second camera may be fixed and predefined as factory settings. The displacements between the first image and the second image may be predefined, and no real-time calibration may be needed from end-users. In some aspects, the orientation of a front element (e.g., lens) of the first camera and the orientation of a front element (e.g., lens) of the second camera may be adjustable by end users according to specific needs, and real-time calibration may be needed when aligning the projected images.

At step 308, panoramic imaging system 100 identifies an area of difference between the first aligned image and the second aligned image. The area of difference may include a continuous area in the first image and/or the second image. In some aspects, one or more overlapping areas in the first image and the second image may be identified, such as by comparing the pixel value of the pixels in the first aligned image and the second aligned image. The area of difference may be identified by screening pixel by pixel in the identified one or more overlapping areas of the first aligned image and the second aligned image. Pixel value difference (e.g., color difference) of each pixel in the one or more overlapping areas between the first aligned image and the second aligned image may be calculated. An area of difference between the first image and the second image may be identified when the pixel value difference of one or more pixels in the one or more overlapping areas between the first aligned image and the second aligned image is larger than a predefined threshold value.

At decision block 310, panoramic imaging system 100 determines in each aligned image whether the identified area of difference includes image data of an obstructing object in a close range within the panoramic imaging system.

In some aspects, the panoramic imaging system determines in each aligned image whether the identified area of difference includes image data of an obstructing object in a close range within the panoramic imaging system by calculating color variance of pixels within the identified area of difference. In some aspects, the obstructing object in a close range within the panoramic imaging system is monochromatic. For example, the obstructing object may include obstructing object 206, such as a tripod and other mounting assembly that mounts panoramic imaging system 100 in FIG. 2. In some aspects, the object of smaller color variance in the identified area of difference may be determined as the obstructing object in a close range within the panoramic imaging system.

In some aspects, the panoramic imaging system determines in each aligned image whether the identified area of difference includes image data of an obstructing object in a close range within the panoramic imaging system by using a high-pass filter. In some aspects, an obstructing object may be within a close range to the first camera and/or the second camera, and may be out of focus in the first image and/or second image. Frequency information of the pixels in the identified area of difference in each of the first image and second image may be extracted. In some aspects, the identified area of difference with an out-of-focus obstructing object may contain less frequency information in a high frequency range than a far-range target object that is in focus. In some aspects, frequency information of the pixels in the identified area of difference may be input into the high-pass filter with a convolution factor such as:

$$\begin{matrix} 1, & -1, & 1 \\ -1, & 1, & -1 \\ 1, & -1, & 1 \end{matrix}$$

In some aspects, output from the high-pass filter with a lower energy may be identified as the identified area of difference that includes an obstructing object in a close range within the panoramic imaging system.

In some aspects, the panoramic imaging system may determine in each aligned image whether the identified area of difference includes image data of an obstructing object in a close range within the panoramic imaging system or a target object in a far range within the panoramic imaging system by multilateration, triangulation, and/or double-sided two-way ranging.

At step 312, in response to the determination at block 310 that the identified area of difference includes image data of an obstructing object in a close range within the panoramic imaging system, panoramic imaging system 100 removes image data of the obstructing object from the aligned images. Image data of the identified obstructing object in the first aligned image are replaced by image data of a target object in a far-range within the panoramic imaging system of an area in the second aligned image corresponding to the identified area of difference in the first aligned image. Image data of the identified obstructing object in the second aligned image are replaced by image data of a target object in a far-range within the panoramic imaging system of an area in the first aligned image corresponding to the identified area of difference in the second aligned image.

Figure 4:
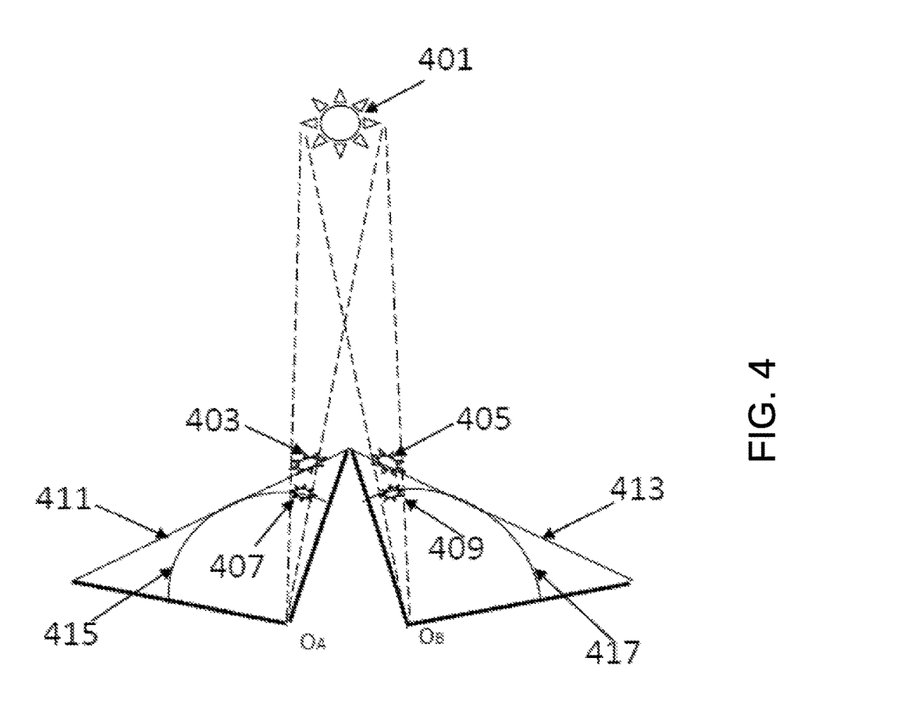
FIG. 4 is a schematic illustration of coordinate transformation of images captured by multiple cameras of a panoramic imaging system according to one embodiment of the present disclosure.

FIG. 4 is a schematic illustration of coordinate transformation of images captured by multiple cameras of a panoramic imaging system according to one embodiment of the present disclosure. Not all of the depicted components may be used, however, and one or more implementations may include additional components not shown in the figure. Variations in the arrangement and type of the components may be made without departing from the scope of the subject technology. Additional components, different components, or fewer components may be provided.

As shown in FIG. 4, object 401 may be captured by two unparalleled cameras, such as first camera 101 and second camera 102 shown in FIG. 2. Object 401 may be a target scene and/or an obstructing object associated with panoramic imaging system 100 in FIG. 2. A first original image 403 may be captured on a first flat surface 411 by the first camera 101 from one angle of field of view. A second original image 405 may be captured on a second flat surface 413 by the second camera 102 from another angle of field of view. First original image 403 may be projected from the first flat surface 411 onto a first cylindrical surface 415 as a first projected image 407. Second original image 405 may be projected from the second flat surface 413 onto a second cylindrical surface 417 as a second projected image 409. First cylindrical surface 415 and second cylindrical surface 417 may have a same curvature. FIG. 4 is for explanatory purposes only. The number of cameras of panoramic imaging system 100 is not limited to two. The number of cameras of panoramic imaging system 100 may be three, four, five or any number. The geometry of the surfaces 415 and 417 are not limited to a cylindrical surface either. The geometry of the surfaces 415 and 417 may be a flat surface or any curved surface of equal curvature.

Figure 5:
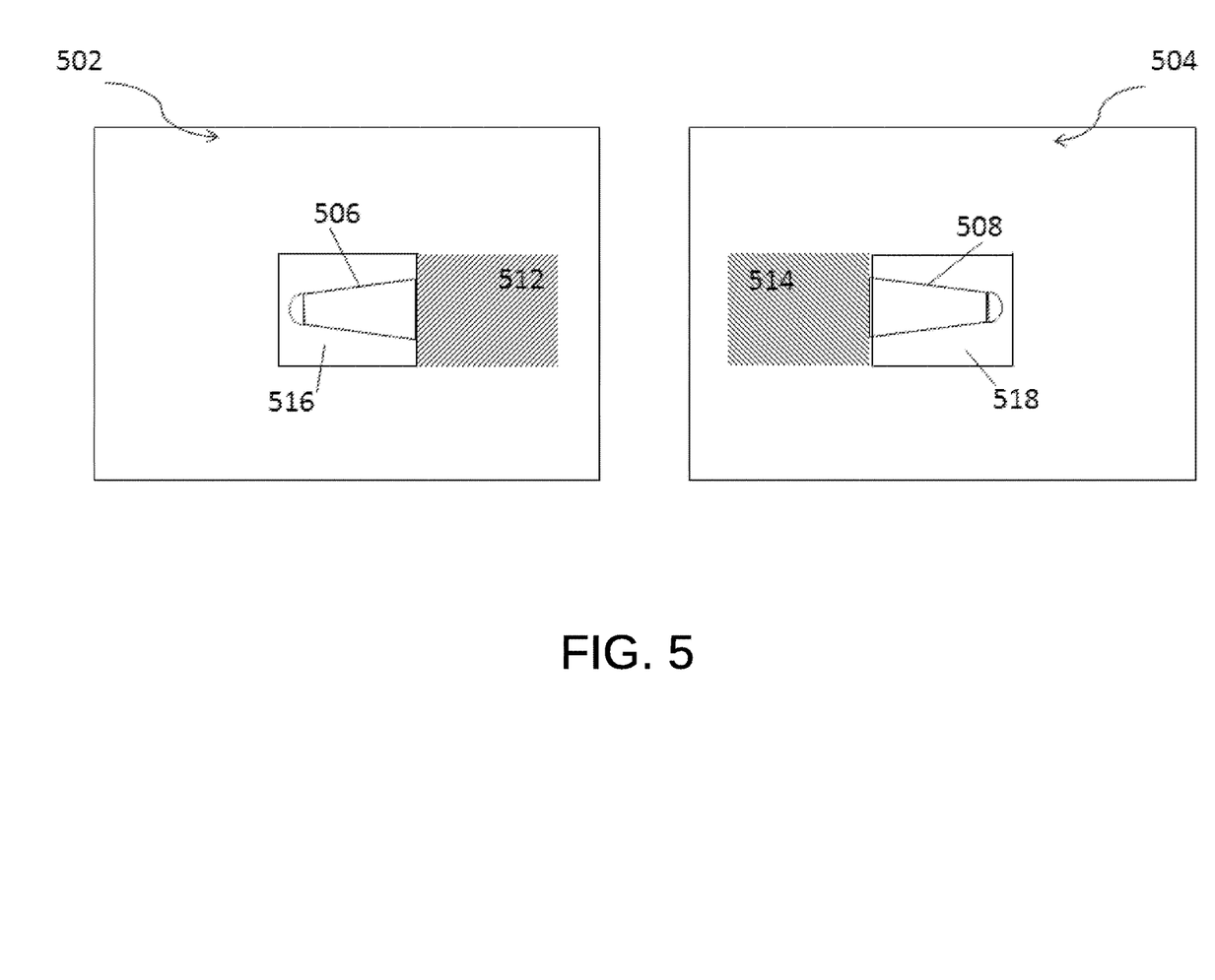
FIG. 5 illustrates an example of a first aligned image and a second aligned image with an obstructing object according to one embodiment of the present disclosure.

FIG. 5 illustrates an example of a first aligned image and a second aligned image with an obstructing object according to one embodiment of the present disclosure. Not all of the depicted components may be used, however, and one or more implementations may include additional components not shown in the figure. Variations in the arrangement and type of the components may be made without departing from the scope of the subject technology. Additional components, different components, or fewer components may be provided.

First aligned image 502 and second aligned image 504 may be obtained by a pixel-based alignment process as described with reference to step 306 in FIG. 3 based on a first image and a second image captured by panoramic imaging system 100 in FIG. 2. As shown in FIG. 5, first image data 506 is enclosed within first obstructed area 516 in first aligned image 502. First image data 506 may include image data of obstructing object 206. First obstructed area 516 may be an area of difference between first aligned image 502 and second aligned image 504. Second image data 508 is enclosed within second obstructed area 518 in second aligned image 504. Second image data 508 may include image data of obstructing object 206. Second obstructed area 518 may be an area of difference between first aligned image 502 and second aligned image 504.

First aligned image 502 may include first target object 512 in a far range within panoramic imaging system 100. Second aligned image 504 may include image data of second target object 514 in a far range within panoramic imaging system 100. First target object 512 and second target object 514 may be portions of an entire target object captured by panoramic imaging system 100. First target object 512 may overlap with second obstructed area 518 after the projection and alignment process. First target object 512 may be obstructed by obstructing object 206 in second obstructed area 518. Second target object 514 may overlap with first obstructed area 516 after the projection and alignment process. Second target object 514 may be obstructed by obstructing object 206 in first obstructed area 516.

In some aspects, the present image processing algorithm replaces first image data 506 with image data of second target object 514, such as by replacing image data of first obstructed area 516 with image data of second target object 514. The present image processing algorithm also replaces second image data 508 with image data of first target object 512, such as by replacing image data of second obstructed area 518 with image data of first target object 512. After the replacement process, first image data 506 and second image data 508 are removed, and the target object becomes unblocked. FIG. 5 is used for explanatory purposes. The number of aligned images are not limited to two. The number of aligned images may be three, four, five or more. The number of obstructed areas upon removal is not limited to one per image. The number of obstructed areas upon removal may be two, three, four, or any number per image.

Figure 6:
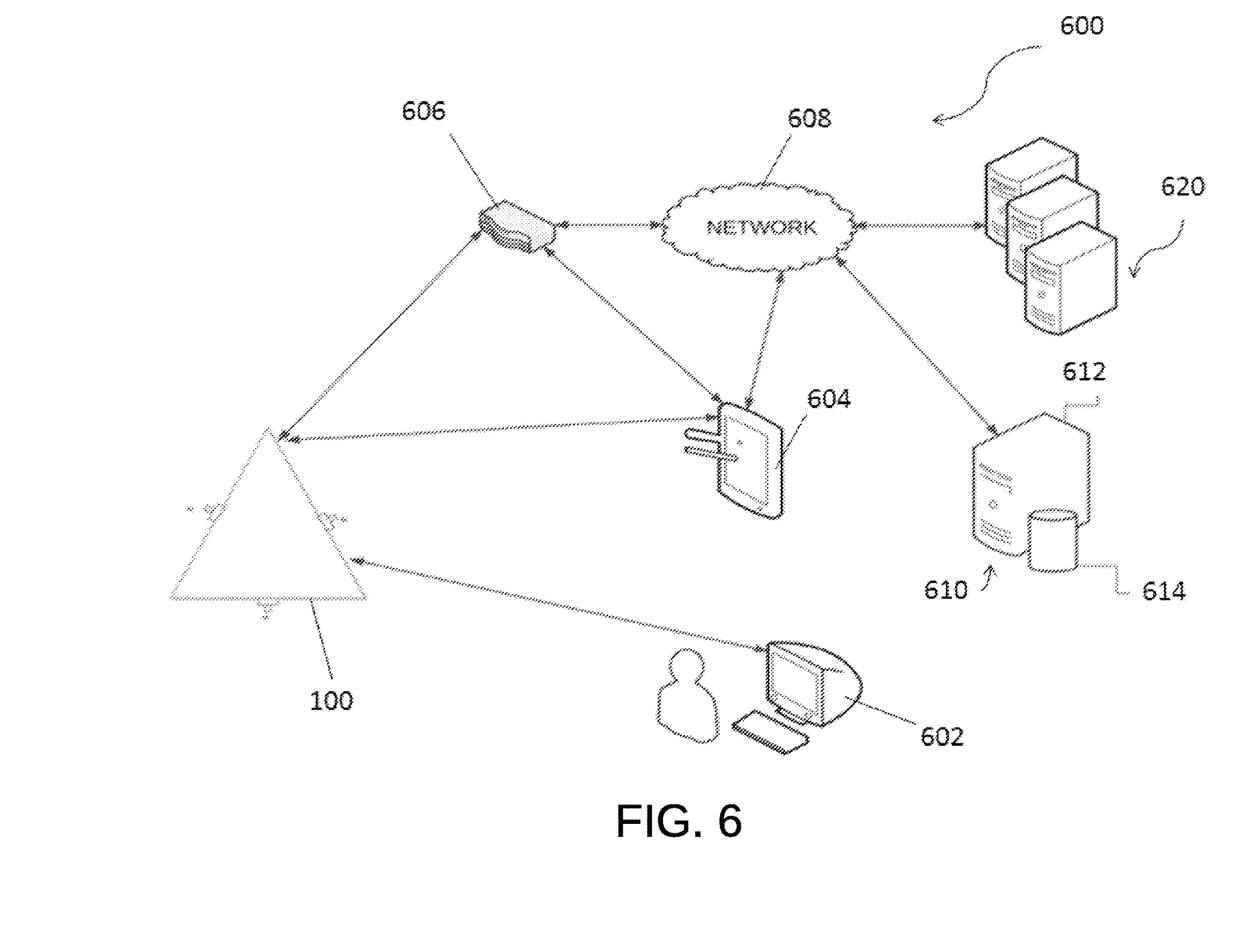
FIG. 6 illustrates an example network environment which provides for capturing and processing panoramic photographs and videos.

FIG. 6 illustrates an example network environment which provides for capturing and processing panoramic photographs and videos. Not all of the depicted components may be used, however, and one or more implementations may include additional components not shown in the figure. Variations in the arrangement and type of the components may be made without departing from the scope of the subject technology. Additional components, different components, or fewer components may be provided.

Network environment 600 includes panoramic imaging system 100, computing devices 602 and 604 communicably connected to servers 610 and 620 via network 608. Computing devices 602 and 604 may access network 608 via wireless access point 606.

Each of computing devices 602 and 604 can represent various forms of processing devices. Example processing devices can include a desktop computer, a laptop computer, a handheld computer, a personal digital assistant (PDA), a cellular telephone, a network appliance, a camera, a smart phone, an enhanced general packet radio service (EGPRS) mobile phone, a media player, a navigation device, an email device, a game console, or a combination of any these data processing devices or other data processing devices. Computing devices 602 and 604 may be provided access to or receive application software executed or stored on any of other computing devices 602 and 604.

Server 610 can include computing device 612 and computer-readable storage device 614 (e.g., data stores). Each of servers 610 and 620 may be a system or device having a processor, a memory, and communications capability for providing content and/or services to the computing devices. In some example aspects, each of servers 610 and 620 can be a single computing device, for example, a computer server. In other embodiments, each of servers 610 and 620 can represent more than one computing device working together to perform the actions of a server computer (e.g., cloud computing). Further, each of servers 610 and 620 can represent various forms of servers including, but not limited to an application server, a proxy server, a network server, an authentication server, an electronic messaging server, a content server, a server farm, etc., accessible to computing devices 602 and 604. For example, server 610 may be a web server that delivers web content accessible through network 608.

A user may interact with the content and/or services provided by servers 610 and 620, through a client application installed at computing devices 602 and 604. Alternatively, the user may interact with the system through a web browser application at computing devices 602 and 604. Communication between computing devices 602 and 604 and servers 610 and 620 may be facilitated through network 608.

In some aspects, computing devices 602 and 604 may communicate wirelessly through a communication interface (not shown), which may include digital signal processing circuitry where necessary. The communication interface may provide for communications under various modes or protocols, for example, Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. For example, the communication may occur through a radio-frequency transceiver (not shown). In addition, short-range communication may occur, for example, using a Bluetooth, WiFi, or other such transceiver.

As described above with reference to FIG. 1, panoramic imaging system 100 of FIG. 1 includes cameras 101, 102 and 103, a control system and housing 120. In some aspects, panoramic imaging system 100 may be a handheld device with 360-degree panorama real-time recording and broadcasting capabilities. Panoramic imaging system 100 may be used to capture horizontal 360-degree panoramic image data within a front, rear, left and right direction of panoramic imaging system 100 and achieve real-time broadcasting and sharing of the image data. Panoramic imaging system 100 may generate 360-degree panoramic image data by imaging stitching and construction, and send to computing devices 602 and 604 via a wireless communication method, and/or store the encoded image data locally on panoramic imaging system 100, for example, on a Secure Digital (SD) Card.

In some aspects, panoramic imaging system 100 may send the generated 360-degree panoramic image data to computing device 604, for example, including a smartphone, for live broadcast via a wireless communication method. In some aspects, panoramic imaging system 100 may send the generated 360-degree panoramic image data to the cloud via wireless access point 606 to achieve cloud data storage and sharing. 360-degree panoramic image data in the cloud can be broadcast in computing device 604, such as smart devices and/or a web end device. In some aspects, panoramic imaging system 100 may send the 360-degree panoramic image data to computing device 602 for storage and playback via Universal Serial Bus (USB) 3.0 standard. In some aspects, panoramic imaging system 100 may send the 360-degree panoramic image data to computing device 602 for playback via a High-Definition Multimedia Interface (HDMI). In some aspects, panoramic imaging system 100 may store the encoded 360-degree panoramic image data in a SD Card on panoramic imaging system 100.

Figure 7:
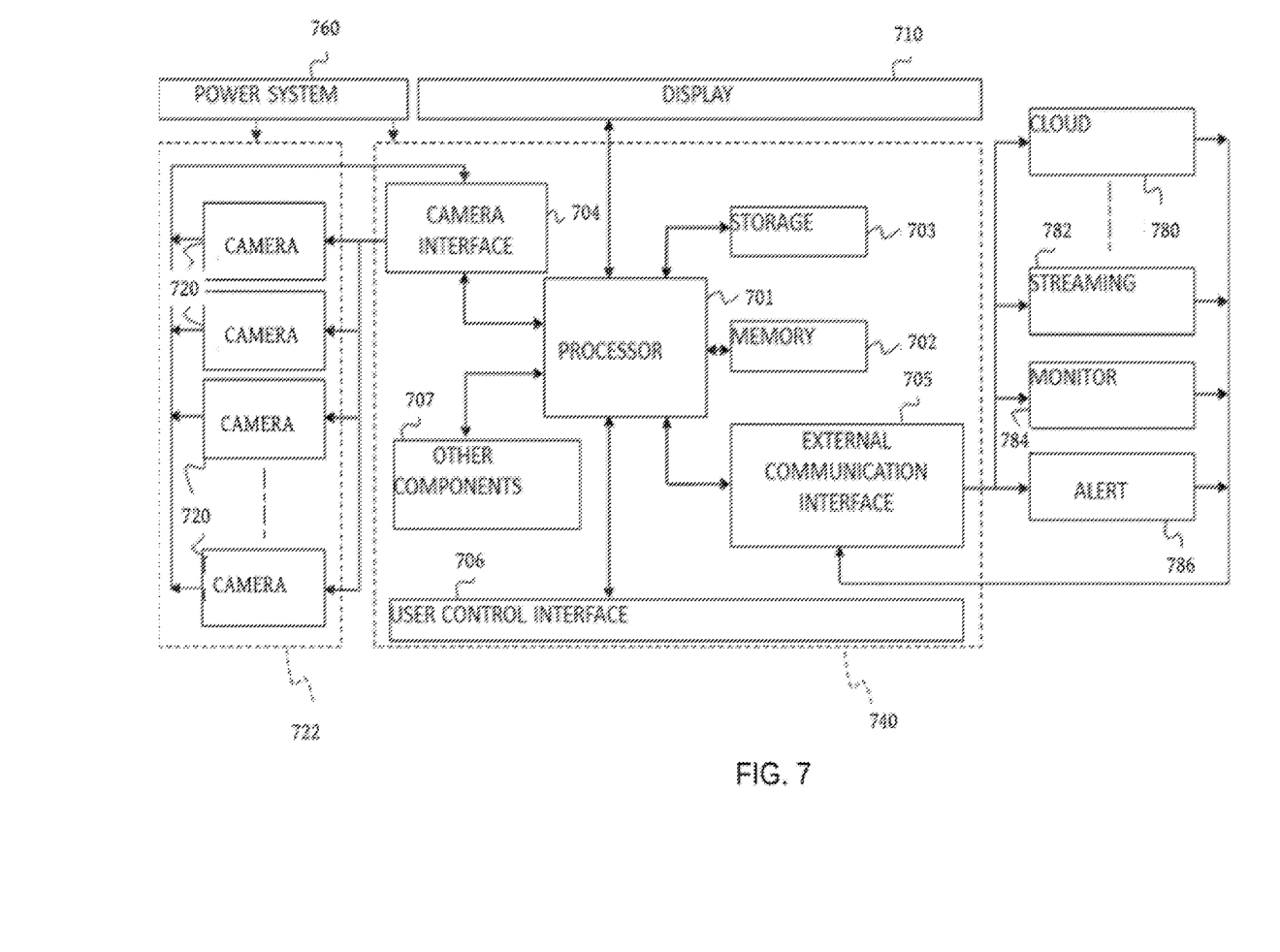
FIG. 7 conceptually illustrates an example electronic system with which some implementations of the subject technology can be implemented.

FIG. 7 conceptually illustrates an example electronic system 700 with which some implementations of the subject technology can be implemented. Not all of the depicted components may be used, however, and one or more implementations may include additional components not shown in the figure. Variations in the arrangement and type of the components may be made without departing from the scope of the subject technology. Additional components, different components, or fewer components may be provided.

The example electronic system may include an example panoramic imaging system, such as panoramic imaging system 100 as described above with reference to FIGS. 1, 2 and 6. According to the present disclosure, the example panoramic imaging system includes a control system that controls the functions of the optical system 722 and at least an image processing algorithm. Particularly, the control system 740 includes at least a processor 701, a memory 702, a storage device 703, a camera interface 704, an external communication interface 705, and a user control interface 706. The control system 740 can be a general-purpose computer system such as a Personal Computer (PC), or preferably a custom-designed computing system. Particularly in some embodiments, the control system 740 is a system on chip (SOC); that is, an integrated circuit (IC) integrates all components and functions of the control system 740 into a single chip, which makes the present panoramic imaging system portable and electronically durable as a mobile device. In some embodiments, the control system 740 may be located internally within a same housing where the optical system 722 is located. Alternatively, in other embodiments, the control system 740 is separated from the optical system 722 to allow end users' selection of different models of an optical system 722 to be used with the control system 740.

The storage device 703 is preloaded with at least the image processing algorithm of the present disclosure. Other customer-designed software programs may be preloaded during manufacture or downloaded by end users after they purchase the system. Exemplary customer-designed software programs to be used with the present panoramic imaging system include but are not limited to software that further processes panoramic images or videos according to an end user's needs, such as 3D modeling, object tracking, and virtual reality programs. Further exemplary customer-designed software includes but is not limited to image editing programs that allow users to adjust color, illumination, contrast or other effects in a panoramic image, or film editing programs that allow users to select favorite views from a panoramic video to make normal videos.

The electronic circuitry in the processor 701 carries out instructions of the various algorithms. Thus, the various software programs, stored on the storage device 703 and executed in the memory 702 by the processor 701, direct the control system 740 to act in concert with the optical system 722 to perform various functions, which include but are not limited to receiving commands from an end user or an external device or service 701, defining the precise geometry of the cameras 720, commanding the cameras 720 to capture raw image data, tagging and storing raw data in a local storage device 703 and/or commuting raw data to an external device or service 701, processing raw data to create panoramic images or videos according to commands received, presenting generated panoramas on a local display 710 and/or communicating generated panoramas to be stored or presented on an external device or service 780, 782, 784 and 786.

The processor 701 of the present disclosure can be any integrated circuit (IC) that is designed to execute instructions by performing arithmetic, logical, control and input/output (I/O) operations specified by algorithms. Particularly, the processor can be a central processing unit (CPU) and preferably a microprocessor that is contained on a single IC chip. In some embodiments, the control system 740 may employ a multi-core processor that has two or more CPUs or array processors that have multiple processors operating in parallel. In some embodiments, the processor 701 is an application specific integrated circuit (ASIC) that is designed for a particular use rather than for general purpose use. Particularly, in some embodiments, the processor 701 is a digital signal processor (DSP) designed for digital signal processing. More particularly, in some embodiments, the processor 701 is an on-chip image processor, specialized for image processing in a portable camera system. In some embodiments, the control system 740 includes a graphic processing unit (GPU), which has a massively parallel architecture consisting of thousands of smaller, more efficient cores designed for handling multiple tasks simultaneously. Particularly, in some embodiments, the control system 740 may implement GPU-accelerated computing, which offloads compute-intensive portions of an algorithm to the GPU while keeping the remainder of the algorithm to run on the CPU.

The memory 702 and the storage 703 of the present disclosure can be any type of primary or secondary memory device compatible with the industry standard, such as read-only memory (ROM), random access memory (RAM), electrically erasable programmable read-only memory (EEPROM), and flash memory. In the embodiments where the control system 740 is a single chip system, the memory 702 and storage 703 blocks are also integrated on-chip with the processor 701 as well as other peripherals and interfaces. In some embodiments, the on-chip memory components may be extended by having one or more external solid-state storage media, such a secure digital (SD) memory card or a USB flash drive, reversibly connected to the imaging system. For example, the various memory units include instructions for removing an obstructing object in a panoramic image. From these various memory units, the processor 701 retrieves instructions to execute and data to process in order to execute the processes of some implementations.

The camera interface 704 of the present disclosure can be any form of command and data interface usable with a camera 720, such as a digital camera. Exemplary embodiments include USB, FireWire and any other interface for command and data transfer that may be commercially available. Additionally, it is preferred, although not required, that the optical system 722 be equipped with a single digital control line that would allow a single digital signal to command all the cameras 720 simultaneously to capture an image of a scene.

The external communication interface 705 of the present disclosure can be any data communication interface, and may employ a wired, fiber-optic, wireless, or another method for connection with an external device or service 780, 782, 784 and 786. Ethernet, wireless-Ethernet, Bluetooth, USB, FireWire, USART, SPI are exemplary industry standards. In some embodiments, where the control system 740 is a single chip system, the external communication interface 705 is integrated on-chip with the processor 701 as well as other peripherals and interfaces.

The user control interface 706 of the present disclosure can be any design or mode that allows effective control and operation of the panoramic imaging system from the user end, while the system feeds back information that aids the user's decision making process. Exemplary embodiments include but are not limited to graphical user interfaces that allow users to operate the system through direct manipulation of graphical icons and visual indicators on a control panel or a screen, touchscreens that accept users' input by touch of fingers or a stylus, voice interfaces which accept users' input as verbal commands and outputs via generating voice prompts, gestural control, or a combination of the aforementioned modes of interface.

The control system 740 of the present disclosure may further include other components that facilitate its function. For example, the control system 740 may optionally include a location and orientation sensor that could determine the location and orientation of the panoramic imaging system. Exemplary embodiments include a global positioning system (GPS) that can be used to record geographic positions where image data are taken, and a digital magnetic compass system that can determine the orientation of camera system in relation to the magnetic north. The control system 740 may optionally be equipped with a timing source, such as an oscillator or a phase-locked loop, which can be used to schedule automatic image capture, to time stamp image data, and to synchronize actions of multiple cameras to capture near simultaneous images in order to reduce error in image processing. The control system 740 may optionally be equipped with a light sensor for environmental light conditions, so that the control system 740 can automatically adjust hardware and/or software parameters of the system.

In some embodiments, the present panoramic imaging system is further equipped with an internal power system 760 such as a battery or solar panel that supplies the electrical power. In other embodiments, the panoramic imaging system is supported by an external power source. In some embodiments, the panoramic imaging system is further equipped with a display 710, such that panoramic photos may be presented to a user instantly after image capture, and panoramic videos may be displayed to a user in real time as the scenes are being filmed.

In some embodiments, the present panoramic imaging system may be used in conjunction with an external device for displaying and/or editing panoramas generated. Particularly, the external device can be any electronic device with a display and loaded with software or applications for displaying and editing panoramic images and videos created by the present system. In some embodiments, the external device can be smart phones, tablets, laptops or other devices programmed to receive, display, edit and/or transfer the panoramic images and videos. In some embodiments, the present panoramic imaging system may be used in conjunction with an external service, such as Cloud computing and storage 780, online video streaming 782 and file sharing 782, remote surveillance 784, and alert 786 for home and public security.

The exemplary embodiments set forth above are provided to give those of ordinary skill in the art a complete disclosure and description of how to make and use the embodiments of the devices, systems and methods of the disclosure, and are not intended to limit the scope of what the inventors regard as their disclosure. Modifications of the above-described modes for carrying out the disclosure that are obvious to persons of skill in the art are intended to be within the scope of the following claims. All patents and publications mentioned in the disclosure are indicative of the levels of skill of those skilled in the art to which the disclosure pertains. All references cited in this disclosure are incorporated by reference to the same extent as if each reference had been incorporated by reference in its entirety individually.

The entire disclosure of each document cited (including patents, patent applications, journal articles, abstracts, laboratory manuals, books, or other disclosures) is hereby incorporated herein by reference.

It is to be understood that the disclosures are not limited to particular compositions or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

A number of embodiments of the disclosure have been described. Nevertheless, it will be understood that various modifications may be made without departing from the spirit and scope of the present disclosure. Accordingly, other embodiments are within the scope of the following claims.

What is claimed is:

1. A machine-implemented method for generating panoramic digital representation of an area, comprising:
    acquiring a first image and a second image by a first camera and a second camera of an imaging system, respectively;
    performing a coordinate transformation of the first image and the second image to image to generate a first projected image and a second projected image;
    comparing the first projected image and the second projected image to generate a first aligned image and a second aligned image;
    identifying an area of difference between the first aligned image and the second aligned image;
    determining whether the identified area of difference includes image data of an obstructing object associated with the imaging system; and
    removing image data of the obstructing object from the first aligned image, in response to the determination that the identified area of difference in the first aligned image includes image data of an obstructing object associated with the imaging system, thereby generating a panoramic digital representation of the area.

2. The machine-implemented method of claim 1, wherein the first camera has a field of view that overlaps with the field of view of the second camera.

3. The machine-implemented method of claim 1, wherein the performing a coordinate transformation comprises:
    establishing a cylindrical coordinate system for the first image and the second image in a cylinder tangential to the first image and the second image; and projecting pixels of the first image and the second image onto surface of the cylinder thereby obtaining cylindrical coordinates of the pixels.

4. The machine-implemented method of claim 1, wherein the comparing the first projected image and the second projected image comprises:
rearranging pixels of the first projected image and the second projected image in a plane according to cylindrical coordinates, thereby generating the first aligned image and the second aligned image.

5. The machine-implemented method of claim 1, wherein the determining whether the identified area of difference includes image data of an obstructing object associated with the imaging system comprises calculating color variance of the identified area of difference or frequency information of the identified area of difference.

6. The machine-implemented method of claim 1, further comprising removing image data of the obstructing object from the second aligned image, in response to the determination that the identified area of difference in the second aligned image includes image data of an obstructing object associated with the imaging system, thereby generating a panoramic digital representation of the area.

7. The machine-implemented method of claim 1, further comprising replacing image data of the obstructing object from the first aligned image with image data of the second aligned image.

8. The method of claim 1, further comprising replacing image data of the obstructing object from the second aligned image with image data of the first aligned image.

9. A system for generating panoramic digital representation of an area, comprising:
a plurality of cameras including at least one camera having a field of view that overlaps with the field of view of at least one other camera among the plurality of cameras;
a controller commanding a first camera and a second camera among the plurality of cameras to acquire a first image and a second image, respectively; and
a processor performing operations comprising:
performing a coordinate transformation of the first image and the second image to generate a first projected image and a second projected image;
comparing the first projected image and the second projected image to generate a first aligned image and a second aligned image;
identifying an area of difference between the first aligned image and the second aligned image;
determining whether the identified area of difference includes image data of an obstructing object associated with the system; and
removing image data of the obstructing object from the first aligned image or the second aligned image, in response to the determination that the identified area of difference in the first aligned image includes image data of an obstructing object associated with the system, thereby generating a panoramic digital representation of the area.

10. The system of claim 9, wherein the first camera has a field of view that overlaps with the field of view of the second camera.

11. The system of claim 9, wherein the performing a coordinate transformation comprises:
establishing a cylindrical coordinate system for the first image and the second image in a cylinder tangential to the first image and the second image; and
projecting pixels of the first image and the second image onto surface of the cylinder thereby obtaining cylindrical coordinates of the pixels.

12. The system of claim 9, wherein the comparing the first projected image and the second projected image comprises:
rearranging pixels of the first projected image and the second projected image in a plane according to cylindrical coordinates, thereby generating the first aligned image and the second aligned image.

13. The system of claim 9, wherein the determining whether the identified area of difference includes image data of an obstructing object associated with the system comprises calculating color variance of the identified area of difference or frequency information of the identified area of difference.

14. The system of claim 9, wherein the operations further comprising replacing image data of the obstructing object from the first aligned image with image data of the second aligned image.

15. The system of claim 9, wherein the operations further comprising replacing image data of the obstructing object from the second aligned image with image data of the first aligned image.

16. The system of claim 9, wherein the operations further comprising removing image data of the obstructing object from the second aligned image, in response to the determination that the identified area of difference in the second aligned image includes image data of an obstructing object associated with the imaging system, thereby generating a panoramic digital representation of the area.

* * * * *